United States Patent
Yamamoto

(10) Patent No.: US 12,054,133 B2
(45) Date of Patent: Aug. 6, 2024

(54) BRAKING CONTROL DEVICE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 222 days.

(21) Appl. No.: 17/790,546

(22) PCT Filed: Jan. 14, 2021

(86) PCT No.: PCT/JP2021/001105
§ 371 (c)(1),
(2) Date: Jul. 1, 2022

(87) PCT Pub. No.: WO2021/145390
PCT Pub. Date: Jul. 22, 2021

(65) Prior Publication Data
US 2023/0063777 A1  Mar. 2, 2023

(30) Foreign Application Priority Data
Jan. 17, 2020 (JP) .................... 2020-005706

(51) Int. Cl.
*B60T 8/1755* (2006.01)

(52) U.S. Cl.
CPC ......... *B60T 8/1755* (2013.01); *B60T 2210/20* (2013.01); *B60T 2230/04* (2013.01); *B60T 2270/30* (2013.01)

(58) Field of Classification Search
CPC ............ B60T 8/1755; B60T 8/17551; B60T 8/17555; B60T 2210/20; B60T 2230/04; B60T 2270/30
See application file for complete search history.

(56) References Cited

U.S. PATENT DOCUMENTS

| | | | |
|---|---|---|---|
| 2002/0024252 A1* | 2/2002 | Banno | B60T 8/1766 303/113.1 |
| 2010/0094495 A1* | 4/2010 | Fujimoto | B60L 15/2036 701/22 |
| 2021/0039631 A1* | 2/2021 | Ito | B60T 8/1766 |

FOREIGN PATENT DOCUMENTS

JP   2005348497 A   12/2005

OTHER PUBLICATIONS

International Search Report (PCT/ISA/210) with English translation and Written Opinion (PCT/ISA/237) mailed on Mar. 9, 2021, by the Japanese Patent Office as the International Searching Authority for International Application No. PCT/JP2021/001105.

* cited by examiner

*Primary Examiner* — Jacob M Amick
(74) *Attorney, Agent, or Firm* — BUCHANAN INGERSOLL & ROONEY PC

(57) ABSTRACT

A braking control device, when stopping a vehicle in a state where a braking force is being applied to the vehicle, executes a reducing control of reducing the braking force corresponding to a braking request before the vehicle stops and executes an increasing control of increasing the braking force corresponding to the braking request before the reducing control in order to suppress vehicle pitching behavior generated when the braking force is applied to the vehicle. The control device sets braking force increase amount in the increasing control based on a difference distance that is a difference between a first distance correlated with a vehicle traveling distance from a reduction start timing when the reducing control is executed until the stopping of the vehicle and a second distance correlated with a vehicle traveling distance from the reduction start timing when the reducing control is not executed until the stopping of the vehicle.

13 Claims, 3 Drawing Sheets

BRAKING CONTROL DEVICE

TECHNICAL FIELD

The present disclosure relates to a braking control device.

BACKGROUND ART

Conventionally, there has been a problem that, when a vehicle stops, a pitching behavior occurs in a vehicle body due to swing-back of a nose dive, and comfort of an occupant is impaired. Therefore, for example, JP 2005-348497 A discloses a control device that suppresses the occurrence of nose dive by smoothing deceleration immediately before the vehicle stops. In addition, this literature describes increasing the deceleration to Gmax before the control for smoothing the deceleration to prevent a delay in stopping the vehicle.

CITATIONS LIST

Patent Literature

Patent Literature 1: JP 2005-348497 A

SUMMARY

Technical Problems

However, in the control device described above, Gmax can be estimated as the maximum deceleration from the name, and a large deceleration feeling may be given to the driver before stopping. In addition, in the control device described above, since the deceleration is once increased and then reduced, the change gradient of the braking force tends to become large. For this reason, there is a concern about generation of an oil striking sound due to a rapid change in hydraulic pressure (high flow speed of brake fluid), and the like. As described above, in the device for preventing delay in stopping the vehicle, there is room for improvement in the control device from the viewpoint of the comfort of the occupant at the time the vehicle stops.

An object of the present disclosure is to provide a braking control device capable of preventing delay in stopping a vehicle and improving comfort of an occupant in the braking of the vehicle.

Solutions to Problems

A braking control device of the present disclosure includes a braking unit that applies a braking force to a vehicle in response to a braking request; and a control device that, when stopping the vehicle in a state where the braking force is being applied to the vehicle, executes a reducing control of reducing the braking force corresponding to the braking request before the vehicle stops and executes an increasing control of increasing the braking force corresponding to the braking request before the reducing control in order to suppress a pitching behavior of the vehicle generated when the braking force is applied to the vehicle; where the control device sets an increase amount of the braking force in the increasing control based on a difference distance that is a difference between a first distance correlated with a traveling distance of the vehicle from a reduction start timing when the reducing control is executed until the stopping of the vehicle and a second distance correlated with a traveling distance of the vehicle from the reduction start timing when the reducing control is not executed until the stopping of the vehicle.

Advantageous Effects

According to the present disclosure, the difference between the first distance and the second distance, that is, the traveling distance that increases by the reducing control is calculated, and the increase amount of the braking force in the increasing control is set based on the calculation result. As a result, the increasing control can be executed with the minimum increase amount of the braking force necessary for preventing the increase in the traveling distance necessary for stopping. According to the present disclosure, the increase gradient and the maximum value of the braking force can be set based on the increase amount so as to minimize the sense of deceleration that can be caused by the increasing control as much as possible. As described above, according to the present disclosure, a delay in the stopping of the vehicle can be prevented and the comfort of the occupant can be improved.

DESCRIPTION OF EMBODIMENT

Figure 1:
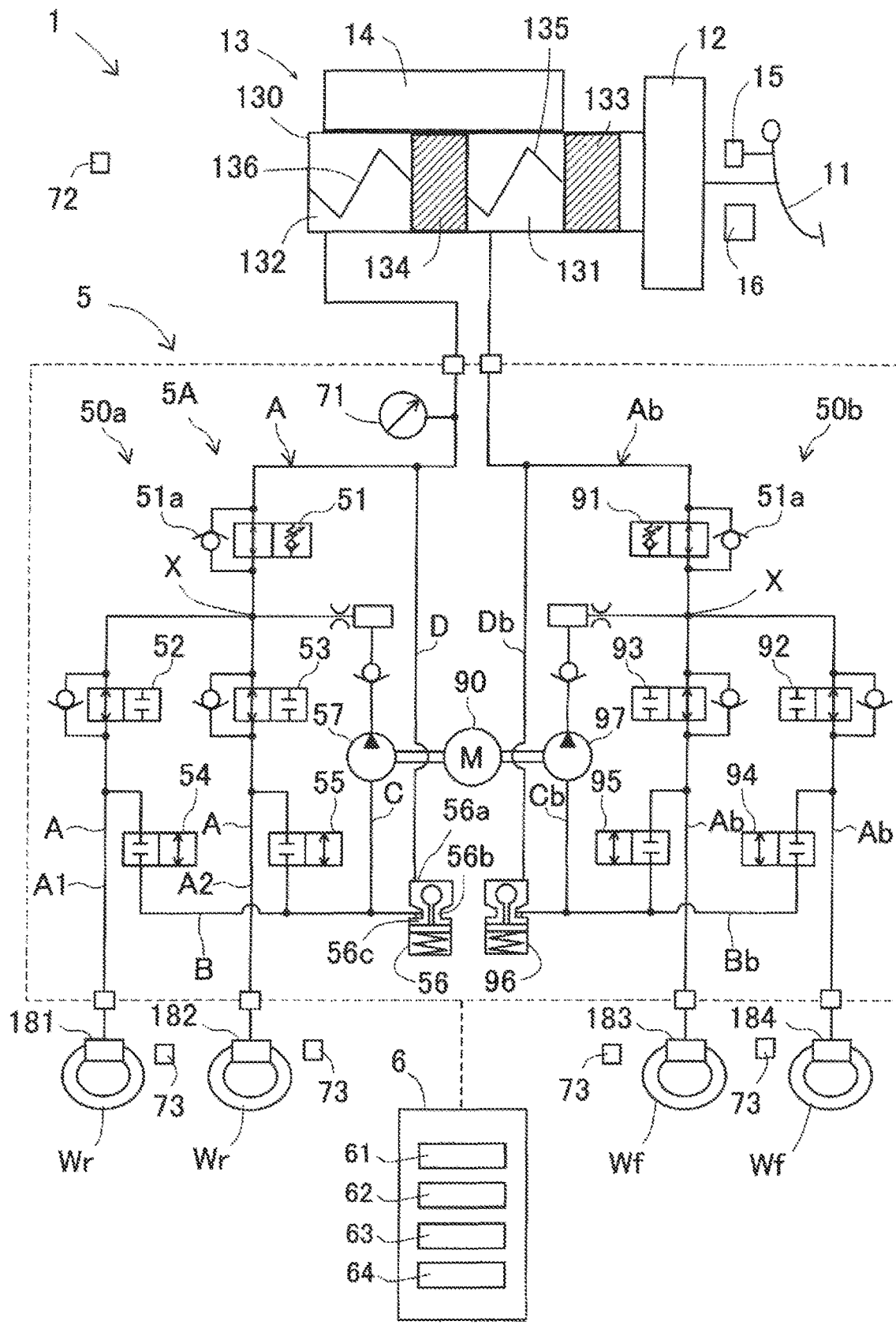
FIG. 1 is a configuration view of a braking control device according to the present embodiment.

Hereinafter, an embodiment of the present disclosure will be described based on the drawings. Each drawing used for description is a conceptual diagram. As shown in FIG. 1, a braking control device 1 of the present embodiment includes a brake pedal 11, a booster 12, a master cylinder unit 13, a reservoir 14, a brake switch 15, a stroke sensor 16, an actuator (corresponds to "braking unit") 5, and a brake ECU (corresponds to "control device") 6.

The brake pedal 11 is an operation member that allows the driver to operate the brake. The brake switch 15 is a sensor that detects whether or not the brake pedal 11 is operated. The stroke sensor 16 is a sensor that detects the pedal stroke (hereinafter referred to as "stroke") of the brake pedal 11. The brake switch 15 and the stroke sensor 16 output the detection signal to the brake ECU 6.

The booster 12 is a device that assists brake operation, and is, for example, a hydro-booster equipped with an accumulator, an electromagnetic valve, and the like. In this case, the brake pedal 11 is provided with a stroke simulator (not illustrated) that generates a reaction force with respect to the brake operation. The booster 12 uses an accumulator to generate a servo pressure corresponding to a stroke at the rear side of the master piston 133 described later. The master piston 133 moves forward by being pressed by the servo pressure. This configuration has a by-wire configuration in which the brake pedal 11 and the master cylinder unit 13 cooperatively move by control. The booster 12 is preferentially operated, for example, when a large braking force is required.

The master cylinder unit 13 is a device that generates a master pressure corresponding to the operation of the brake pedal 11. Specifically, the master cylinder 130 is a cylinder member and includes a first master chamber 131 and a second master chamber 132 in which a master pressure is generated. The master cylinder unit 13 is configured so that the same hydraulic pressure is formed in the first master chamber 131 and the second master chamber 132.

The first master chamber 131 is formed between the first master piston 133 and the second master piston 134. The second master chamber 132 is formed between the second master piston 134 and the bottom portion of the master cylinder 130. A first spring 135 is interposed between the first master piston 133 and the second master piston 134. A second spring 136 is interposed between the second master piston 134 and the bottom portion of the master cylinder 130. The reservoir 14 stores the brake fluid and resupplies the brake fluid to the master cylinder 130 (master chambers 131, 132). Communication between the reservoir 14 and the master chambers 131 and 132 is blocked when the master pistons 133 and 134 move forward by a predetermined amount.

The actuator 5 is a device that adjusts the hydraulic pressure (hereinafter referred to as "wheel pressure") of each wheel cylinder 181 to 184 based on the master pressure supplied from the master cylinder 130. The actuator 5 is disposed between the master cylinder 130 and the wheel cylinder 181 to 184. The actuator 5 adjusts the wheel pressure in accordance with an instruction from the brake ECU 6. For example, a disc brake device or a drum brake device (not illustrated) provided on each of the wheels Wf and Wr is driven according to the wheel pressure, and a braking force is generated at each of the wheels Wf and Wr.

In response to an instruction from the brake ECU 6, the actuator 5 executes pressure increasing control for setting the wheel pressure to the same level as the master pressure, pressurization control for setting the wheel pressure to be higher than the master pressure, pressure reducing control for reducing the wheel pressure, or holding control for holding the wheel pressure. The actuator 5 executes, for example, anti-skid control (or also referred to as ABS control), sideslip prevention control (ESC control), automatic pressurization control, or the like based on the instruction from the brake ECU 6. The automatic pressurization control is pressurization control performed according to a set target deceleration regardless of the presence or absence of a brake operation by the driver, for example, in automatic driving, adaptive cruise control, or the like.

Specifically, the actuator 5 includes a hydraulic circuit 5A and a motor 90. The hydraulic circuit 5A includes a first piping system (corresponds to a "second supply unit") 50a and a second piping system (corresponds to a "first supply unit") 50b. The first piping system 50a is connected to the wheel cylinders 181 and 182 of the rear wheel Wr. The second piping system 50b is connected to the wheel cylinders 183 and 184 of the front wheel Wf. Each of the wheels Wf, Wr is provided with a wheel speed sensor 73.

(First Piping System)

The first piping system 50a includes a flow path A, a first differential pressure valve 51, holding valves 52 and 53, a pressure reducing flow path B, pressure reducing valves 54 and 55, a pressure adjusting reservoir 56, a reflux flow path C, a pump 57, an auxiliary flow path D, and a pressure sensor 71. In the description, the term "flow path" can be replaced with a term such as, for example, a fluid path, a hydraulic pressure path, an oil path, a pipeline, a passage, or a piping. The flow path A is a flow path connecting the master cylinder 130 and the wheel cylinders 181 and 182.

The first differential pressure valve 51 is a normally open type linear solenoid valve provided in the flow path A. Based on the magnitude of the applied control current and the drive of the pump 57, the first differential pressure valve 51 makes the hydraulic pressure in the flow path on the wheel cylinders 181 and 182 side higher than the hydraulic pressure in the flow path on the master cylinder 130 side. That is, the first differential pressure valve 51 is an electromagnetic valve capable of adjusting the differential pressure between the master pressure and the wheel pressure.

The first differential pressure valve 51 is closed to increase the wheel pressure until the differential pressure reaches the target differential pressure, and is opened by the force of the differential pressure to reduce the wheel pressure when the differential pressure becomes higher than the target differential pressure. The first differential pressure valve 51 is provided with a check valve 51a in parallel.

The holding valves 52 and 53 are normally open type electromagnetic valves which are disposed in the flow path A and whose opening and closing are controlled by the brake ECU 6. The flow path A is branched into two flow paths A1 and A2 at a branch point X on the wheel cylinders 181, 182 side of the first differential pressure valve 51 so as to correspond to the wheel cylinders 181 and 182. The holding valve 52 is provided in the flow path A1, and the holding valve 53 is provided in the flow path A2.

The pressure reducing flow path B connects a portion between the holding valve 52 and the wheel cylinder 181 in the flow path A1 and the pressure adjusting reservoir 56, and connects a portion between the holding valve 52 and the wheel cylinder 182 in the flow path A2 and the pressure adjusting reservoir 56.

The pressure reducing valves 54 and 55 are normally open type electromagnetic valves which are disposed in the pressure reducing flow path B and whose opening and closing are controlled by the brake ECU 6. The pressure reducing valve 54 corresponds to the wheel cylinder 181, and the pressure reducing valve 55 corresponds to the wheel cylinder 182. The pressure adjusting reservoir 56 is a so-called low pressure reservoir including a cylinder, a piston, and a biasing member. The reflux flow path C is a flow path that connects the pressure reducing flow path B and the pressure adjusting reservoir 56, and the branch point X.

The pump 57 is driven according to the rotation of the motor 90, and suctions the brake fluid from a suction port and ejects the brake fluid from an ejection port. The pump 57 is provided in the reflux flow path C. The suction port is connected to a portion on the pressure adjusting reservoir 56 and the pressure reducing flow path B side in the reflux flow path C. The ejection port is connected to a portion on the branch point X side in the reflux flow path C. That is, the pump 57 suctions the brake fluid from the second master chamber 132 via the pressure adjusting reservoir 56 and ejects the brake fluid to the branch point X by the rotation of the motor 90.

The auxiliary flow path D is a flow path connecting a pressure adjusting hole 56a of the pressure adjusting reservoir 56 and a portion on the master cylinder 130 side than the first differential pressure value 51 in the flow path A. The pressure adjusting reservoir 56 is configured so that a valve hole 56b closes with increase in the inflow amount of the brake fluid to the pressure adjusting hole 56a due to increase in stroke. A reservoir chamber 56c is formed on the flow paths B and C side of the valve hole 56b. The pressure sensor 71 is a sensor that detects the master pressure. The pressure sensor 71 transmits the detection result to the brake ECU 6. Since the second piping system 50*b* has a configuration similar to the first piping system 50*a*, the description thereof will be omitted. The actuator 5 is a device including a motor 90 and a pump 57 driven by the motor 90 and configured to be able to adjust a wheel pressure which is a braking hydraulic pressure.

(Second Piping System)

The second piping system 50*b* has a configuration similar to the first piping system 50*a*, and includes a flow path Ab that corresponds to the flow path A and connects the master cylinder 130 and the wheel cylinders 183 and 184, a second differential pressure valve 91 that corresponds to the first differential pressure valve 51, holding valves 92 and 93 that correspond to the holding valves 52 and 53, a pressure reducing flow path Bb that corresponds to the pressure reducing flow path B, pressure reducing valves 94 and 95 that correspond to the pressure reducing valves 54 and 55, a pressure adjusting reservoir 96 that corresponds to the pressure adjusting reservoir 56, a reflux flow path Cb that corresponds to the reflux flow path C, a pump 97 that corresponds to the pump 57, and an auxiliary flow path db that corresponds to the auxiliary flow path D. Two pumps 57 and 97 are driven by one motor 90. The pumps 57 and 97 are controlled by the control of the motor 90. As the explanation of the first piping system 50*a* can be referred to for the detailed configuration of the second piping system 50*b*, the description thereof will be omitted. In addition, the vehicle is provided with an acceleration sensor 72 that detects acceleration in the front-rear direction.

Here, each control state by the brake ECU 6 will be briefly described using the control on the wheel cylinder 181 as an example. In a state where there is no control on the actuator 5, the first differential pressure valve 51 and the holding valve 52 are in the open state, the pressure reducing valve 54 is in the closed state, and the master pressure is supplied to the wheel cylinder 181. In the pressure reducing control, the holding valve 52 is in the closed state and the pressure reducing valve 54 is in the open state. In the holding control, the holding valve 52 and the pressure reducing valve 54 are in the closed state. Furthermore, the holding control can also be executed by closing the pressure reducing valve 54 and throttling the first differential pressure valve 51 without closing the holding valve 52. In the pressurization control, the first differential pressure valve 51 is in the differential pressure state (closed state until reaching the target differential pressure), the holding valve 52 is in the open state, the pressure reducing valve 54 is in the closed state, and the pump 57 is driven. As described above, the actuator 5 is a device that applies braking force to the vehicle in response to the braking request (instruction from the brake ECU 6).

(Brake ECU)

The brake ECU 6 is an electronic control unit including a CPU, a memory, and the like. Specifically, the brake ECU 6 is configured to execute various types of control by one or a plurality of processors. Various sensors such as the brake switch 15, the stroke sensor 16, the pressure sensor 71, and the wheel speed sensor 73 are connected to the brake ECU 6 by a communication line (not shown). The brake ECU 6 determines whether or not the booster 12 and the actuator 5 need to be activated based on the detection results of these various sensors.

When determining that the actuator 5 needs to be activated, the brake ECU 6 calculates a target wheel pressure, which is a target value of the wheel pressure, for each wheel cylinder 181 to 184, and controls the actuator 5. The target wheel pressure corresponds to the target deceleration and the target braking force. The brake ECU 6 can calculate each wheel pressure based on the detection value of the pressure sensor 71 and the control states of the first differential pressure valve 51 and the second differential pressure valve 91.

(Control at the Time of Stopping)

When stopping the vehicle while the braking force is being applied to the vehicle, the brake ECU 6 executes reducing control for reducing the braking force corresponding to the braking request before the vehicle stops and executes increasing control for increasing the braking force corresponding to the braking request before the reducing control in order to suppress the pitching behavior of the vehicle generated when the braking force is applied to the vehicle. The reducing control is a control for suppressing the nose dive by reducing the braking force (deceleration) of the vehicle more than the target braking force (braking force corresponding to the braking request) immediately before the stopping of the vehicle. The increasing control can also be said to be a raising control of the target braking force.

In the present embodiment, the braking force of the vehicle is the sum of the braking force of the front wheel Wf (hereinafter referred to as "front wheel braking force") and the braking force of the rear wheel Wr (hereinafter referred to as "rear wheel braking force"). The front wheel braking force is calculated based on the wheel pressures of the wheel cylinders 183 and 184 of the front wheel Wf. The rear wheel braking force is calculated based on the wheel pressures of the wheel cylinders 181 and 182 of the rear wheel Wr.

The brake ECU 6 sets the increase amount of the braking force in the increasing control based on a difference distance which is a difference between a first distance correlated with the traveling distance of the vehicle from the reduction start timing when the reducing control is executed until the stopping of the vehicle and a second distance correlated with the traveling distance of the vehicle from the reduction start timing when the reducing control is not executed until the stopping of the vehicle.

More specifically, the brake ECU 6 includes a first calculation unit 61, a second calculation unit 62, a difference calculation unit 63, and an increase setting unit 64. The first calculation unit 61 sets the reduction start timing for starting the reducing control based on the braking force and the vehicle speed, and calculates the first distance correlated with a traveling distance of the vehicle from the reduction start timing when the reducing control is executed until the stopping of the vehicle. The first distance may be, for example, a traveling distance from a current time point until stop (hereinafter, also referred to as "stop required distance") with the current time point (time point of calculation of the first distance) as a reference. The stop required distance correlates with a traveling distance of the vehicle from the reduction start timing until the stopping of the vehicle.

The second calculation unit 62 calculates the second distance correlated with a traveling distance of the vehicle from the reduction start timing when the reducing control is not executed until the stopping of the vehicle based on the braking force and the vehicle speed. The second distance may be, for example, a stop required distance with the current time point (time point of calculation of the first distance) as a reference, similar to the first distance. In this case, the second distance is a stop required distance when the reducing control is not executed, and can also be said to be a reference stop distance. The first distance and the second distance are calculated by the same calculation method.

The difference calculation unit 63 calculates a difference between the first distance and the second distance. That is, the difference calculation unit 63 calculates the stop required distance which increases by executing the reducing control. For example, the brake ECU 6 constantly (at predetermined intervals) calculates the first distance, the second distance, and the difference from the current braking force and the vehicle speed.

The increase setting unit 64 sets the increase amount of the braking force in the increasing control based on a difference distance, which is a difference between the first distance and the second distance. The increase amount of the braking force can be calculated based on, for example, the maximum value of the braking force, the duration of the increasing control, and the increase gradient of the braking force. That is, the increase amount of the braking force can be said to be a difference between the time integrated value of the braking force when the increasing control is executed and the time integrated value of the braking force when the increasing control is not executed. The increase setting unit 64 sets the increase gradient, the duration, and the maximum value of the braking force in the increasing control so as to realize the calculated increase amount. The increase setting unit 64 sets these set values to values that take into consideration the comfort of the occupant.

The increase setting unit 64 of the present embodiment calculates a minimum increase amount of the braking force (hereinafter referred to as "necessary increase amount") necessary for preventing an increase in the stop required distance. The increase setting unit 64 sets the calculated necessary increase amount to the braking force to be increased by the increasing control. The increase setting unit 64 calculates the necessary increase amount every time the difference distance is calculated.

The increase setting unit 64 sets the maximum value of the braking force in the increasing control based on, for example, the necessary increase amount, a predetermined increase gradient, and a predetermined control duration. The predetermined increase gradient is selected, for example, from a predetermined numerical range set in advance within a range that does not give the driver a sense of discomfort. Furthermore, the predetermined increase gradient is set to, for example, a gradient at which no oil striking sound is generated in consideration of the reduction gradient in the reducing control. The predetermined control duration is set, for example, such that the time from the start of the increasing control to the completion of the reducing control is less than the reaction time of the driver to be described later. The brake ECU 6 may set at least one of the duration of the reducing control and the duration of the increasing control based on the increase amount of the braking force in the increasing control.

Common Effects of the Present Embodiment

According to the present embodiment, the difference between the first distance and the second distance, that is, the stop required distance that increases by the reducing control is calculated, and the increase amount of the braking force in the increasing control is set based on the calculation result. As a result, the increasing control can be executed with the minimum increase amount of the braking force necessary for preventing the increase in the stop required distance. According to the present embodiment, the increase gradient and the maximum value of the braking force can be set based on the increase amount so as to minimize the sense of deceleration that can be caused by the increasing control as much as possible. As described above, according to the present embodiment, it is possible to prevent a delay in the stopping of the vehicle and improve the comfort of the occupant.

(Example of Reducing Control and Increasing Control)

An example of the reducing control and the increasing control will be described with reference to FIG. 2. When the wheel pressure is increased and the braking force is generated at time t1, the brake ECU 6 constantly calculates the first distance, the second distance, and the difference distance in a state where the braking force is being generated. The first distance and the second distance are calculated on the assumption that the braking force at the time of calculation is maintained constant until the vehicle stops. The brake ECU 6 calculates how many seconds it will take the vehicle to come to a stop, that is, the stop timing (time t6) based on the second distance. The brake ECU 6 inversely calculates each timing (control start vehicle speed etc.) from the stop timing (vehicle speed=0).

The brake ECU 6 calculates a reduction start timing (time t5), which is a timing to start the reducing control, based on the reduction gradient of the braking force in the reducing control set in advance (hereinafter referred to as a "predetermined reduction gradient") and the minimum value of the braking force. The predetermined reduction gradient is a gradient at which the oil striking sound of the brake fluid is less likely to occur, and is a gradient within an allowable range set with emphasis on comfort. In consideration of variations in device operation, each value is set such that the reduction gradient in the last predetermined time (predetermined time before completion of the reducing control) of the set duration of the reducing control becomes 0 (that is, the braking force becomes constant).

In addition, the brake ECU 6 sets the minimum value of the braking force in the reducing control based on the gradient and the creep torque of the road surface on which the vehicle is traveling. The creep torque is a torque generated without operating the accelerator pedal at the time the vehicle stops due to the configuration of the engine and the torque transmission mechanism. The minimum value of the braking force in the reducing control is set to a value at which the vehicle can maintain the stop even by the influence of the road surface gradient and the creep torque.

The brake ECU 6 calculates a vehicle speed (hereinafter referred to as "reduction start vehicle speed") at the reduction start timing from the current braking force and the vehicle speed. The brake ECU 6 starts the reducing control when the current vehicle speed reaches the reduction start vehicle speed. In this example, the reduction gradient is set in advance, but the reduction start vehicle speed may be set in advance.

The brake ECU 6 calculates an increase start timing (time t4) which is a timing to start the increasing control based on the calculated stop timing (time t6) and a preset specified time. The specified time is a time for executing the increasing control and the reducing control. In other words, the brake ECU 6 executes the increasing control and the reducing control at a specified time (time t4 to t6). In other words, the brake ECU 6 starts the increasing control before a specified time from the stop timing (time t6).

The specified time in the present embodiment is set to a time within the reaction time of the driver. The reaction time of the driver (also referred to as "recognition/reaction time") is a time (e.g., one second) from a time point at which the driver recognizes the deceleration of the vehicle until the driver performs some operation by the recognition. The reaction time of the driver can be acquired (calculated/estimated) in advance based on experiments and statistical data.

The brake ECU 6 calculates a vehicle speed (hereinafter referred to as "increase start vehicle speed") at the increase start timing from the current braking force and the vehicle speed. The brake ECU 6 starts the increasing control when the current vehicle speed reaches the increase start vehicle speed. The brake ECU 6 calculates the maximum duration (continuable time) of the increasing control from the calculated increase start timing (time t4) and the reduction start timing (time t5).

The brake ECU 6 calculates a necessary increase amount based on the difference distance each time the difference distance is calculated. The brake ECU 6 calculates a minimum increase gradient (hereinafter referred to as a "minimum increase gradient") of the braking force required in the increasing control based on the necessary increase amount and the maximum duration. When the calculated minimum increase gradient is less than a specified gradient set in advance, the brake ECU 6 sets the change gradient of the braking force in the increasing control to a predetermined increase gradient less than the specified gradient (minimum increase gradient predetermined increase gradient<specified gradient).

The brake ECU 6 calculates the maximum value (and the maximum value duration) of the braking force in the increasing control based on the predetermined increase gradient, the necessary increase amount, and the maximum duration. The brake ECU 6 executes the increasing control with the set predetermined increase gradient and maximum value during the maximum duration (times t4 to t5).

In the present example, the reducing control reduces the braking force from the maximum value of the braking force in the increasing control. Thus, the reduction gradient of the braking force in the reducing control is slightly larger than the predetermined reduction gradient used in the calculation. The predetermined reduction gradient is set to be within an allowable range (small) even if the reduction gradient becomes large by the increasing control.

On the other hand, when the minimum increase gradient is greater than or equal to the specified gradient or the necessary increase amount is greater than or equal to the specified value, the brake ECU 6 reduces the duration of the reducing control within a preset allowable range (e.g., a range that does not impair the comfort of the occupant) and calculates the minimum increase gradient again, for example, so that the maximum duration of the increasing control becomes large. When the minimum increase gradient does not become less than the specified gradient with the change within the allowable range, the brake ECU 6 determines not to execute the increasing control and the reducing control.

The brake ECU 6 may calculate the maximum value of the braking force in the increasing control based on the predetermined increase gradient, the necessary increase amount, and the maximum duration without calculating the minimum increase gradient, and determine whether or not the maximum value is less than the specified value. In this case, the brake ECU 6 executes the increasing control with the maximum value when the maximum value is less than the specified value, and changes the increase gradient of the increasing control or the duration of the reducing control within the allowable range when the maximum value is greater than or equal to the specified value and calculates the maximum value again.

In the present example, the brake ECU 6 increases only the braking force of the rear wheel Wr in the increasing control. That is, in the increasing control, the brake ECU 6 controls the first piping system 50a of the actuator 5 according to the target braking force (target wheel pressure) of the rear wheel Wr to increase the wheel pressure of the rear wheel Wr. The brake ECU 6 merely needs to increase at least one of the braking force of the front wheel Wf and the braking force of the rear wheel Wr in the increasing control.

The duration of the reducing control and the increasing control in the present embodiment is set based on the natural frequency of the pitching behavior (pitch natural frequency of the vehicle) that occurs at the time of vehicle stop. For example, the variation time of the braking force in the reducing control and the variation time of the braking force in the increasing control are set so as not to be less than or equal to ¼ (or less than or equal to ½) of the cycle of the pitching behavior. For example, when the braking force varies at less than or equal to a half cycle of the pitching behavior, the behavior by the control and the pitching behavior at the time of stopping tend to resonate. Based on this finding, the minimum value of the variation time (reduction time) of the braking force in the reducing control and the minimum value of the variation time (increase time) of the braking force in the increasing control are set such that resonance between the behavior by the control and the pitching behavior is suppressed. Note that the cycle of the pitching behavior may vary depending on the vehicle, but is a value less than the reaction time of the driver.

(Control from Start of Braking to Increasing Control)

Figure 2:
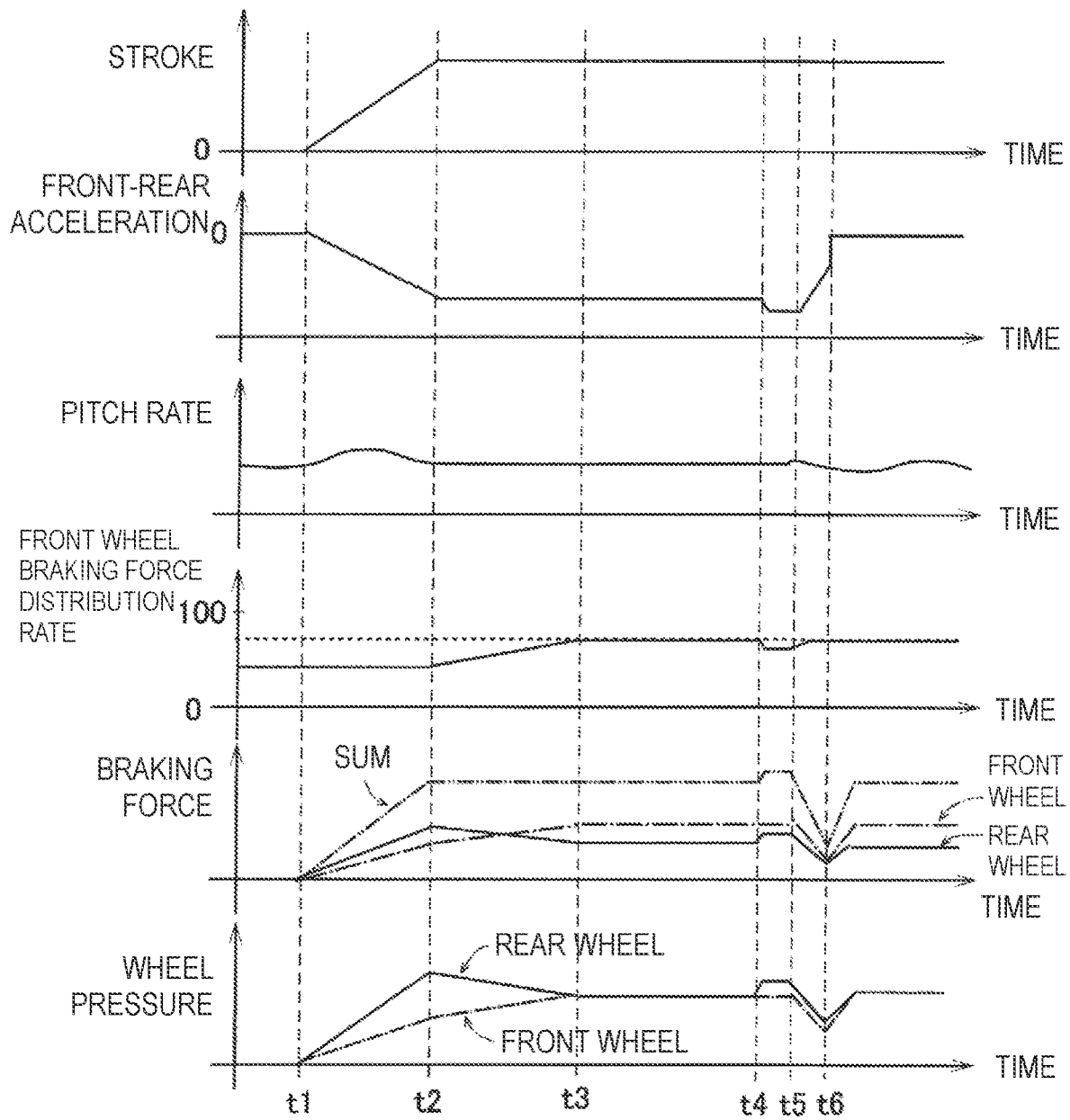
FIG. 2 is a time chart for describing an example of a control at the time of stopping according to the present embodiment.

As illustrated in FIG. 2, when the braking is started at time t1, the front-rear distribution of the wheel pressure is set such that the wheel pressure of the rear wheel Wr becomes larger than the wheel pressure of the front wheel Wf. The distribution rate of the wheel pressure of the rear wheel Wr with respect to the sum of the wheel pressure of the front wheel Wf and the wheel pressure of the rear wheel Wr is a predetermined value larger than 50%. After time t2, when the braking force reaches the target braking force and becomes stable, each wheel pressure is gradually changed so that the wheel pressure of the front wheel Wf and the wheel pressure of the rear wheel Wr match while maintaining the target braking force. That is, the brake ECU 6 brings the wheel pressure of the front wheel Wf and the wheel pressure of the rear wheel Wr close to each other so that the wheel pressures of the front and rear wheels are at the same level. As a result, the wheel pressure (front wheel braking force) of the front wheel Wf gradually increases, and the wheel pressure (rear wheel braking force) of the rear wheel Wr gradually reduces. At time t3, the wheel pressures of the front and rear wheels become the same value (the same level), and the distribution rate of the front wheel braking force in the present embodiment becomes a predetermined value (predetermined value>50%).

(Overall Control Flow)

Figure 3:
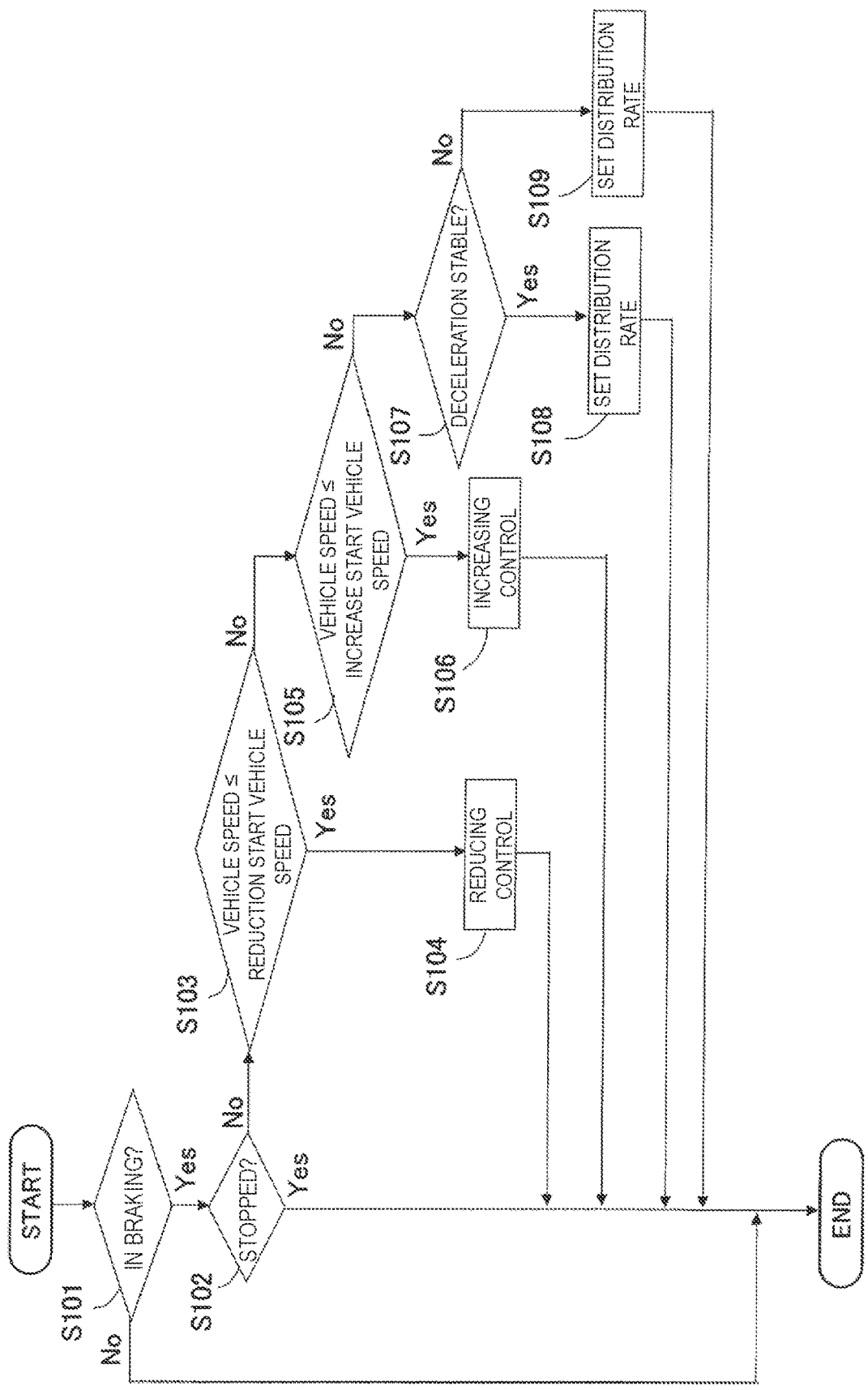
FIG. 3 is a flowchart for describing an example of a control at the time of stopping according to the present embodiment.

Here, an overall control flow in braking will be described with reference to FIG. 3. As a premise, the brake ECU 6 calculates the first distance, the second distance, the difference distance, the reduction start timing (reduction start vehicle speed), the necessary increase amount, the increase start timing (increase start vehicle speed), and the like at predetermined intervals (constantly) based on the current braking force or the target braking force as described above.

The brake ECU 6 determines whether or not braking is currently being performed by operating the brake pedal 11 or automatic brake control based on the wheel pressure (S101). When braking is currently being performed (S101: Yes), the brake ECU 6 determines whether or not the vehicle is stopped based on detection results of various sensors (e.g., the acceleration sensor 72 and the wheel speed sensor 73) (S102). When the vehicle is stopped (S101: No), the brake ECU 6 generates braking force by predetermined braking force distribution.

When the vehicle is not stopped (S102: No), the brake ECU 6 determines whether or not the vehicle speed is lower than or equal to the reduction start vehicle speed (S103). The vehicle speed can be calculated from the detection result of, for example, the wheel speed sensor 73. When the vehicle speed is lower than or equal to the reduction start vehicle speed (S103: Yes), the brake ECU 6 executes the reducing control (S104). When the vehicle speed is not lower than or equal to the reduction start vehicle speed (S103: No), the brake ECU 6 determines whether or not the vehicle speed is lower than or equal to the increase start vehicle speed (S105). When the vehicle speed is lower than or equal to the increase start vehicle speed (S105: Yes), the brake ECU 6 executes the increasing control (S106). In the increasing control, only the rear wheel braking force is increased.

When the vehicle speed is not lower than or equal to the increase start vehicle speed (S105: No), the brake ECU 6 determines whether or not the deceleration is in a stable state and the necessary increase amount is larger than or equal to the specified value (S107). For example, when the gradient of the target deceleration (differential value of deceleration: jerk) is less than or equal to a threshold value, the brake ECU 6 determines that the deceleration is stable. When the gradient of the target deceleration is less than or equal to the threshold value and the necessary increase amount is larger than or equal to the specified value (S107: Yes), the brake ECU 6 sets the target value of the front wheel distribution rate of the braking force to a predetermined value (the target wheel pressures of the front and rear wheels are the same value) and gradually increases the distribution rate of the front wheel braking force (S108).

When the gradient of the target deceleration is larger than the threshold value or when the necessary increase amount is less than the specified value (S107: No), the brake ECU 6 sets the front-rear distribution of the braking force so as to suppress the pitching behavior due to the increase in the braking force (S109). Specifically, the brake ECU 6 makes the distribution rate of the wheel pressure of the rear wheel Wr to be larger than 50%. When the braking force is stable and execution of the increasing control is necessary, the brake ECU 6 matches the wheel pressures of the front and rear wheels for preparation of the increasing control and the reducing control (ensure comfort). Thus, the brake ECU 6 executes change in the front-rear distribution of the braking force, increasing control, and reducing control according to the situation.

Other Effects of the Present Embodiment

The brake ECU 6 sets at least one of the duration of the reducing control and the duration of the increasing control based on the pitch natural frequency of the vehicle. According to this configuration, the behavior of the vehicle by the reducing control and the increasing control can be suppressed from resonating with respect to the pitching behavior of when the vehicle stops. That is, an increase in pitching behavior can be suppressed.

In addition, the brake ECU 6 sets the minimum value of the braking force in the reducing control based on at least one of the gradient of the road surface on which the vehicle is traveling and the creep torque of the vehicle. According to this configuration, sufficient braking force can be exerted even at the time of completion of the reducing control.

In addition, the actuator 5 includes a second piping system 50*b* that supplies the brake fluid to the wheel cylinders 183 and 184 of the front wheel Wf to generate the front wheel braking force by the wheel pressure of the front wheel Wf, and a first piping system 50*a* that supplies the brake fluid to the wheel cylinders 181 and 182 of the rear wheel Wr to generate the rear wheel braking force by the wheel pressure of the rear wheel Wr. Then, the brake ECU 6 controls the actuator 5 so that the wheel pressure of the rear wheel Wr becomes larger than the wheel pressure of the front wheel Wf with the start of braking, and thereafter, the wheel pressure of the front wheel Wf and the wheel pressure of the rear wheel Wr are brought close to each other until the increasing control is executed.

According to this configuration, at the start of braking, the distribution rate of the wheel pressure of the rear wheel Wr is made larger than 50%, whereby the nose dive is suppressed and the pitching behavior is suppressed. At the execution of the increasing control, the wheel pressure of the front wheel Wf and the wheel pressure of the rear wheel Wr are close to each other (at the same level), and the balance of the flow speed of the brake fluid by the increasing control and the reducing control is easily maintained. That is, the flow speed of the brake fluid in one of the front and rear wheels is suppressed from becoming extremely large. As a result, the generation of the oil striking sound is suppressed. Furthermore, in applying the same braking force to the vehicle, increasing the wheel pressure of the two wheels makes it easier to avoid a minute oil pressure control region than increasing the wheel pressure of the four wheels, so that the pressure adjusting accuracy can be improved.

Furthermore, the brake ECU 6 increases only the rear wheel braking force as the increasing control. According to this configuration, the nose dive (pitching behavior) is less likely to occur even by the increase in the braking force, and the reduction in the comfort of the occupant is suppressed.

The brake ECU 6 also sets the duration of the increasing control and the duration of the reducing control such that the sum of the duration of the increasing control and the duration of the reducing control becomes less than the reaction time of the driver. According to this configuration, the increasing control and the reducing control are completed before the driver recognizes and reacts to the increase/reduction of the braking force. Therefore, it is possible to suppress the change of the pedal operation of the driver in response to the control and to stop the vehicle in accordance with the prediction of stopping at the time of the operation of the driver, that is, in accordance with the calculation result of the brake ECU 6.

Here, the reaction time may be a fixed value set in advance, or may be set based on a map or the like set in advance. For example, the brake ECU 6 may set the reaction time based on the state of the driver. The brake ECU 6 estimates the wakefulness (such as drowsiness) and the age of the driver based on a detection result from a device that detects or predicts the state of the driver, for example, a driver monitor that images the driver or a device that detects a vital sign (such as pulse) of the driver. The brake ECU 6 sets the reaction time to be shorter the more the driver is awakened. The brake ECU 6 also sets the reaction time to be longer the higher the age. This enables control corresponding to the state of the driver. The age of the driver may be set in advance. It can also be said that the sum of the durations of the increasing control and the reducing control is set to a predetermined time set based on the reaction time of the driver.

<Others>

The present disclosure is not limited to the embodiment described above. For example, the braking force to be controlled is not limited to the hydraulic braking force, and may be a regenerative braking force or a braking force generated by an electric parking brake. Furthermore, the increase amount of the braking force in the increasing control can be set even with the actuator 5 having one piping system (one channel). The braking unit (actuator 5) may include an electric cylinder. In addition, the generation of the braking force is not limited only to the operation of the brake pedal 11, and may be performed by automatic brake control. The present disclosure can also be applied to a vehicle with one pedal or an automatic drive vehicle.

In addition, the booster 12 may not be provided. In this case, for example, the brake pedal 11 is connected to the stroke simulator in the normal state, and is connected to the master cylinder in the event of an electric failure. Then, only at the time of electric failure, the master cylinder supplies the brake fluid to the wheel cylinder. If the operation feeling of the brake pedal 11 is ignored, the booster 12 may be a vacuum booster that assists the brake operation force by utilizing the intake negative pressure of the engine.

The invention claimed is:

1. A braking control device comprising:
a braking unit that applies a braking force to a vehicle in response to a braking request; and
a control device that, when stopping the vehicle in a state where the braking force is being applied to the vehicle, executes a reducing control of reducing the braking force corresponding to the braking request before the vehicle stops and executes an increasing control of increasing the braking force corresponding to the braking request before the reducing control in order to suppress a pitching behavior of the vehicle generated when the braking force is applied to the vehicle, wherein
the control device sets an increase amount of the braking force in the increasing control based on a difference distance that is a difference between a first distance correlated with a traveling distance of the vehicle from a reduction start timing when the reducing control is executed until the stopping of the vehicle and a second distance correlated with a traveling distance of the vehicle from the reduction start timing when the reducing control is not executed until the stopping of the vehicle.

2. The braking control device according to claim 1, wherein the control device sets at least one of a duration of the reducing control and a duration of the increasing control based on the increase amount of the braking force.

3. The braking control device according to claim 2, wherein the control device sets at least one of a duration of the reducing control and a duration of the increasing control based on a pitch natural frequency of the vehicle.

4. The braking control device according to claim 3, wherein the control device sets a minimum value of the braking force in the reducing control based on at least one of a gradient of a road surface on which the vehicle is traveling and a creep torque of the vehicle.

5. The braking control device according to claim 4, wherein
the braking unit includes a first supply unit that supplies a brake fluid to a wheel cylinder of a front wheel to generate a front wheel braking force by a front-wheel wheel pressure, and a second supply unit that supplies a brake fluid to a wheel cylinder of a rear wheel to generate a rear wheel braking force by a rear-wheel wheel pressure, and
the control device makes the rear-wheel wheel pressure higher than the front-wheel wheel pressure with a start of braking, and then controls the braking unit to bring the front-wheel wheel pressure and the rear-wheel wheel pressure close to each other until the increasing control is executed.

6. The braking control device according to claim 5, wherein the control device sets the duration of the increasing control and the duration of the reducing control such that a sum of the duration of the increasing control and the duration of the reducing control becomes less than a reaction time of a driver.

7. The braking control device according to claim 1, wherein the control device sets at least one of a duration of the reducing control and a duration of the increasing control based on a pitch natural frequency of the vehicle.

8. The braking control device according to claim 7, wherein the control device sets a minimum value of the braking force in the reducing control based on at least one of a gradient of a road surface on which the vehicle is traveling and a creep torque of the vehicle.

9. The braking control device according to claim 8, wherein
the braking unit includes a first supply unit that supplies a brake fluid to a wheel cylinder of a front wheel to generate a front wheel braking force by a front-wheel wheel pressure, and a second supply unit that supplies a brake fluid to a wheel cylinder of a rear wheel to generate a rear wheel braking force by a rear-wheel wheel pressure, and
the control device makes the rear-wheel wheel pressure higher than the front-wheel wheel pressure with a start of braking, and then controls the braking unit to bring the front-wheel wheel pressure and the rear-wheel wheel pressure close to each other until the increasing control is executed.

10. The braking control device according to claim 9, wherein the control device sets the duration of the increasing control and the duration of the reducing control such that a sum of the duration of the increasing control and the duration of the reducing control becomes less than a reaction time of a driver.

11. The braking control device according to claim 1, wherein the control device sets a minimum value of the braking force in the reducing control based on at least one of a gradient of a road surface on which the vehicle is traveling and a creep torque of the vehicle.

12. The braking control device according to claim 1, wherein
the braking unit includes a first supply unit that supplies a brake fluid to a wheel cylinder of a front wheel to generate a front wheel braking force by a front-wheel wheel pressure, and a second supply unit that supplies a brake fluid to a wheel cylinder of a rear wheel to generate a rear wheel braking force by a rear-wheel wheel pressure, and
the control device makes the rear-wheel wheel pressure higher than the front-wheel wheel pressure with a start of braking, and then controls the braking unit to bring the front-wheel wheel pressure and the rear-wheel wheel pressure close to each other until the increasing control is executed.

13. The braking control device according to claim 1, wherein the control device sets the duration of the increasing control and the duration of the reducing control such that a sum of the duration of the increasing control and the duration of the reducing control becomes less than a reaction time of a driver.

* * * * *